United States Patent
Inoue et al.

(10) Patent No.: US 8,011,185 B2
(45) Date of Patent: Sep. 6, 2011

(54) BOOST PRESSURE CONTROL APPARATUS AND BOOST PRESSURE CONTROL METHOD OF INTERNAL COMBUSTION ENGINE

(75) Inventors: Masahiro Inoue, Susono (JP); Hirofumi Kubota, Mishima (JP); Yasuyuki Irisawa, Susona (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 502 days.

(21) Appl. No.: 11/995,803

(22) PCT Filed: Sep. 22, 2006

(86) PCT No.: PCT/IB2006/002626
§ 371 (c)(1),
(2), (4) Date: Jan. 15, 2008

(87) PCT Pub. No.: WO2007/034308
PCT Pub. Date: Mar. 29, 2007

(65) Prior Publication Data
US 2008/0209906 A1    Sep. 4, 2008

(30) Foreign Application Priority Data
Sep. 22, 2005   (JP) .................................. 2005-275832

(51) Int. Cl.
*F02B 33/44* (2006.01)
*F02M 25/07* (2006.01)
*F02D 23/00* (2006.01)
*F01L 1/34* (2006.01)

(52) U.S. Cl. ........ 60/605.2; 60/605.1; 60/602; 701/108; 123/568.14; 123/90.15

(58) Field of Classification Search ................. 60/605.2, 60/605.1, 602; 701/108; 123/568.14, 90.15–90.17, 123/90.44
See application file for complete search history.

(56) References Cited

U.S. PATENT DOCUMENTS 6,050,093 A    4/2000   Daudel et al. ................... 60/602
6,401,457 B1 *  6/2002   Wang et al. ................... 60/605.2
(Continued)

FOREIGN PATENT DOCUMENTS

DE         103 30 632        1/2004
(Continued)

*Primary Examiner* — Thai Ba Trieu
(74) *Attorney, Agent, or Firm* — Oblon, Spivak, McClelland, Maier & Neustadt, L.L.P.

(57) ABSTRACT

A boost pressure control apparatus includes a turbocharger whose turbine is rotationally driven by exhaust of an internal combustion engine, and an EGR device, wherein EGR is performed at the time of supercharge, or the EGR amount is increased at the time of supercharge in comparison with when supercharge is not performed. If the internal EGR gas amount is increased by changing opening/closure timings of intake valves and/or exhaust valves via the EGR device, the energy of exhaust can be increased, so that the rotation speed of the turbocharger can be enhanced. Therefore, the responsiveness of boost pressure rise can be enhanced. Thus, a technology of more promptly raising the boost pressure is provided.

14 Claims, 9 Drawing Sheets

U.S. PATENT DOCUMENTS

| | | | |
|---|---|---|---|
| 6,601,387 B2 * | 8/2003 | Zurawski et al. | 60/605.2 |
| 6,626,164 B2 * | 9/2003 | Hitomi et al. | 123/90.15 |
| 6,681,171 B2 * | 1/2004 | Rimnac et al. | 701/108 |
| 6,725,848 B2 * | 4/2004 | Ramamurthy et al. | 701/108 |
| 6,917,874 B2 * | 7/2005 | Uchida et al. | 701/108 |
| 7,032,382 B2 * | 4/2006 | Onodera et al. | 60/606 |
| 7,137,367 B2 * | 11/2006 | Tanei | 123/90.15 |
| 7,143,580 B2 * | 12/2006 | Ge | 60/605.2 |
| 7,296,562 B2 * | 11/2007 | Withrow et al. | 60/605.2 |
| 7,650,863 B2 * | 1/2010 | Bond et al. | 123/90.44 |
| 2002/0011240 A1 | 1/2002 | Kimura | 123/501 |
| 2003/0164163 A1 | 9/2003 | Lei et al. | 60/605.2 |
| 2005/0109028 A1 | 5/2005 | Shirakawa et al. | 60/602 |
| 2009/0055072 A1 * | 2/2009 | He et al. | 60/602 |

FOREIGN PATENT DOCUMENTS

| | | |
|---|---|---|
| EP | 1 531 249 | 5/2005 |
| GB | 2 267 310 | 12/1993 |
| JP | 7 101011 | 11/1995 |
| JP | 2003 3871 | 1/2003 |
| JP | 2003-129874 | 5/2003 |
| JP | 2005-248748 | 9/2005 |

\* cited by examiner

BOOST PRESSURE CONTROL APPARATUS AND BOOST PRESSURE CONTROL METHOD OF INTERNAL COMBUSTION ENGINE

The disclosure of Japanese Patent Application No. 2005-275832 filed on Sep. 22, 2005, including the specification, drawings and abstract is incorporated herein by reference in its entirety.

BACKGROUND OF THE INVENTION

1. Field of the Invention

The invention relates to an apparatus that controls the boost pressure of an internal combustion engine, and a boost pressure control method.

2. Description of the Related Art

There is a known technology that improves the responsiveness of a turbocharger by increasing the exhaust temperature, that is, the energy of exhaust, through retardation of the ignition timing or retardation of the fuel injection timing, or the like (e.g., see Japanese Examined Patent Application Publication No. HEI 7-101011).

Herein, if the thermal energy of exhaust is increased through retardation of the ignition timing or retardation of the injection timing, or the like, the torque generated by the internal combustion engine correspondingly decreases. Specifically, assuming that the intake air amount is fixed, the net torque becomes smaller if the thermal energy of exhaust is increased than if it is not increased. This is because if the thermal energy of exhaust is increased by retardation of the ignition timing or the like, the boost pressure in the next and later cycle rises, but the torque generated in the present cycle decreases. Even in the case where the responsiveness of boost pressure is enhanced by increasing the energy of exhaust, the drivability deteriorates if the enhancement of the boost pressure responsiveness is surpassed by the decline in the responsiveness of engine rotation speed caused by a decline in the generated torque.

Besides, during rapid acceleration or the like, the generated torque is declined by retarding the ignition timing in order to reduce the shock or the like. In this case, if the retardation of the ignition timing or the like is performed as a means for increasing the energy of exhaust, its effect of preventing decline in drivability is small.

DESCRIPTION OF THE INVENTION

The invention has been accomplished in view of the aforementioned problems, and provides a technology capable of promptly raising the boost pressure in a boost pressure control apparatus and a boost pressure control method of an internal combustion engine.

As an embodiment as an example of the invention, there is provided a boost pressure control apparatus of an internal combustion engine comprising a turbocharger whose turbine is rotationally driven by exhaust of an internal combustion engine, and an EGR device, characterized in that EGR is performed at a time of supercharge, or an EGR amount is increased at the time of supercharge in comparison with when supercharge is not performed.

According to another aspect of the invention, there is provided a boost pressure control method in an internal combustion engine comprising a turbocharger whose turbine is rotationally driven by exhaust of an internal combustion engine, and an EGR device, characterized in that EGR is performed at a time of supercharge, or an EGR amount is increased at the time of supercharge in comparison with when supercharge is not performed.

By performing the EGR, a portion of the high-temperature exhaust generated in a cylinder in the present cycle can be taken into the cylinder in the next and later cycles. Specifically, a portion of the energy generated in the present cycle can be used in the next and later cycles. This increases the total amount of energy in the next and later cycles. Therefore, since the degree of retardation of the ignition timing for increasing the energy of exhaust can be reduced, decline of the engine generated torque can be restrained. Thus, it is possible to increase the energy of exhaust while restraining the decline of the engine generated torque. Hence, the responsiveness of boost pressure rise can be enhanced, and deterioration of the drivability can be restrained.

Besides, in the invention, the boost pressure control apparatus may further comprise a variable valve mechanism that alters opening/closure timing of an intake valve and/or an exhaust valve, wherein the EGR performed at the time of supercharge is an internal EGR performed by controlling the opening/closure timing of the intake valve and/or the exhaust valve.

The internal EGR is performed by once causing burned gas to flow into the exhaust passageway or the intake passageway and then refluxing it through the same passageway and introducing it into the cylinder, or by increasing the burned gas remaining in the cylinder. For example, the internal EGR is performed by sucking the burned gas blown back in the intake passageway into the cylinder again, or by refluxing the burned gas discharged into the exhaust passageway and sucking it into the cylinder, or by reducing the amount of burned gas discharged from the cylinder and thereby increasing the amount of burned gas remaining in the cylinder. The internal EGR can be performed, for example, by the variable valve mechanism altering the opening and closure timings of the exhaust valve. By adjusting the opening timing, the closure timing, the lift amount and the operation angle of the exhaust valve, the variable valve mechanism adjusts the amount of fresh air sucked into the cylinder of the internal combustion engine, the EGR amount, the remaining gas amount (internal EGR amount), the pump loss, etc., so that the operation state of the internal combustion engine is altered. For example, if the pressure in the intake passageway is lower than the pressure in the cylinder or the exhaust passageway, the opening timing of the intake valve is advanced so as to expand the valve overlap during which the intake valve and the exhaust valve are simultaneously open, so that the amount of burned gas blown back to the side of the intake passageway increases. Then, the burned gas blown back into the intake passageway is sucked into the cylinder in the next intake stroke. Therefore, the burned gas in the cylinder in the next cycle increases. Besides, if the closure timing of the exhaust valve is made earlier than the exhaust top dead center, the amount of burned gas blown back to the intake passageway side, and this burned gas is sucked into the cylinder in the intake stroke. Therefore, the burned gas that remains in the cylinder increases. Furthermore, if the closure timing of the exhaust valve is made later than the exhaust top dead center, the burned gas once discharged into the exhaust passageway is refluxed into the cylinder in the intake stroke. Therefore, the burned gas that remains in the cylinder increases. In this manner, the internal EGR amount can be increased. Since the temperature of the internal EGR gas is higher than the temperature of the external EGR gas conveyed via an EGR passageway, the energy in the cylinder can be increased by increasing the proportion of the internal EGR gas in the cylinder.

In the invention, it is preferable that if a pressure of intake is lower than a predetermined value, the EGR at the time of supercharge be prohibited.

The pressure of intake is the pressure of the air taken into the cylinder. If a throttle is provided in the intake passageway, the pressure of intake is the pressure downstream of the throttle. If the pressure of intake is, for example, lower than the pressure upstream of the throttle or the atmospheric pressure, the value of rise of the boost pressure for the value of rise of the turbine rotation speed is small; therefore, even if the exhaust energy is increased, its effect of enhancing the responsiveness of boost pressure rise is small. Besides, if the pressure of intake is low, the internal combustion engine is often operated with low load. In this case, since the temperature of the internal EGR gas is low, execution of the internal EGR will achieve only a small increase in energy in the next and later cycles. On the other hand, the prohibition of the EGR will lead to an increased engine generated torque, so that the intake air amount can be increased by increasing the engine rotation speed. Therefore, the responsiveness of boost pressure rise can be improved. Incidentally, the aforementioned "predetermined value" is an upper limit value of the intake pressure at which performance of the internal EGR will have only a small effect, and is, for example, the pressure upstream of the throttle or the atmospheric pressure.

In the invention, it is preferable that the opening timing of the intake valve be adjusted so that an engine generated torque is within a predetermined range and an internal EGR gas amount becomes maximum.

If the opening timing of the intake valve is advanced, the amount of burned gas that flows into the intake passageway becomes larger, so that the internal EGR gas amount increases. This increases the energy that is added in the next and later cycles. However, if the opening timing of the intake valve is excessively advanced, the responsiveness of boost pressure declines due to a declined torque generated in the present cycle, and the decline in the responsiveness surpasses the rise in the responsiveness of boost pressure obtained in the next and later cycles. In that case, if the amount of advancement of the opening timing of the intake valve is restricted, the decline of the generated torque can be restrained. Furthermore, by maximizing the internal EGR gas amount while the generated torque remains within the range, the responsiveness of boost pressure rise can be improved. Incidentally, the "predetermined range" may be a range such that in the next and later cycles, the rise in the boost pressure caused by an increase in the energy of exhaust can surpass the decline in the boost pressure caused by a decrease in the engine generated torque. Specifically, as long as the engine generated torque is within the range, decline of the engine generated torque in the next and later cycles can be restrained even if the engine generated torque in the present cycle declines due to advancement of the opening timing of the intake valve. Furthermore, by combining retardation of the opening timing of the exhaust valve, the engine generated torque can be increased.

In the invention, it is preferable that when at the time of supercharge an EGR gas amount is increased, an ignition timing be not advanced.

Since an increase of the internal EGR causes slow combustion, the ignition timing is advanced so as to increase the engine generated torque in the related art. Besides, if the EGR gas amount increases, the temperature inside the cylinder rises, so that knocking becomes likely to occur. If knocking occurs, the ignition timing is retarded in the related art. On the other hand, if advancement of the ignition timing is prohibited when there is no risk of occurrence of knocking, the engine generated torque decreases but the exhaust temperature can be correspondingly raised. Therefore, the exhaust energy can be increased, so that the responsiveness of the turbocharger can be bettered.

According to a further aspect of the invention, there is provided a boost pressure control apparatus of an internal combustion engine comprising a variable valve mechanism that alters opening/closure timing of an intake valve and/or an exhaust valve, and exhaust temperature detection means for detecting a temperature of exhaust, characterized in that in an operation region where the temperature of exhaust is greater than or equal to a predetermined temperature, a control of advancing the opening timing of the intake valve is prohibited, and the opening timing of the exhaust valve is retarded by a predetermined amount.

According to a still further aspect, there is provided a boost pressure control method of an internal combustion engine comprising a variable valve mechanism that alters opening/closure timing of an intake valve and/or an exhaust valve, and exhaust temperature detection means for detecting a temperature of exhaust. In this control method, in an operation region where the temperature of exhaust is greater than or equal to a predetermined temperature, a control of advancing the opening timing of the intake valve is prohibited, and the opening timing of the exhaust valve is retarded by a predetermined amount.

For example, if the temperature of the catalyst becomes excessively high, degradation of the catalyst progresses, or the exhaust purification capability of the catalyst declines. Besides, for example, if the temperature of the turbocharger becomes excessively high, there is a risk of damaging the turbocharger. Therefore, for example, if the temperature of the turbocharger and/or the exhaust purification catalyst becomes high to a certain extent, the exhaust temperature cannot be allowed to rise any more; therefore, it becomes difficult to increase the internal EGR. In that case, if the opening timing of the exhaust valve is retarded, the energy that pushes down the piston becomes larger in the energy of the burned gas, so that the engine generated torque increases. Besides, if the opening timing of the intake valve is retarded, the period during which the intake valve and the exhaust valve are both open lengthens. If the exhaust temperature is high, the boost pressure is also high, so that during the overlap period, air is blown by from the intake passageway to the exhaust passageway. This changes the timing of exhaust pulsation so as to decline the back pressure occurring when the intake valve and the exhaust valve are both in the open valve state. As a result, the speed of exhaust near the end of the exhaust stroke can be raised, so that dynamic energy can be given to the turbine, and the responsiveness of boost pressure rise can be enhanced. Besides, by avoiding advancement of the opening timing of the intake valve, increase of the internal EGR can be restrained, so that rise in the exhaust temperature can be restrained Incidentally, the "predetermined temperature" is a lower limit value of the temperature at which there is a risk of decline in the performance of a member provided in the exhaust passageway of the internal combustion engine or a member constituting the internal combustion engine, or a risk of damage of such a member.

According to the boost pressure control apparatus and the boost pressure control method of the internal combustion engine constructed as described above, by performing the EGR, a portion of the energy in the present cycle can be used in the next and later cycles, so that the boost pressure can be promptly raised.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the invention will be described in more detail with reference to exemplary embodiments.

Figure 1:
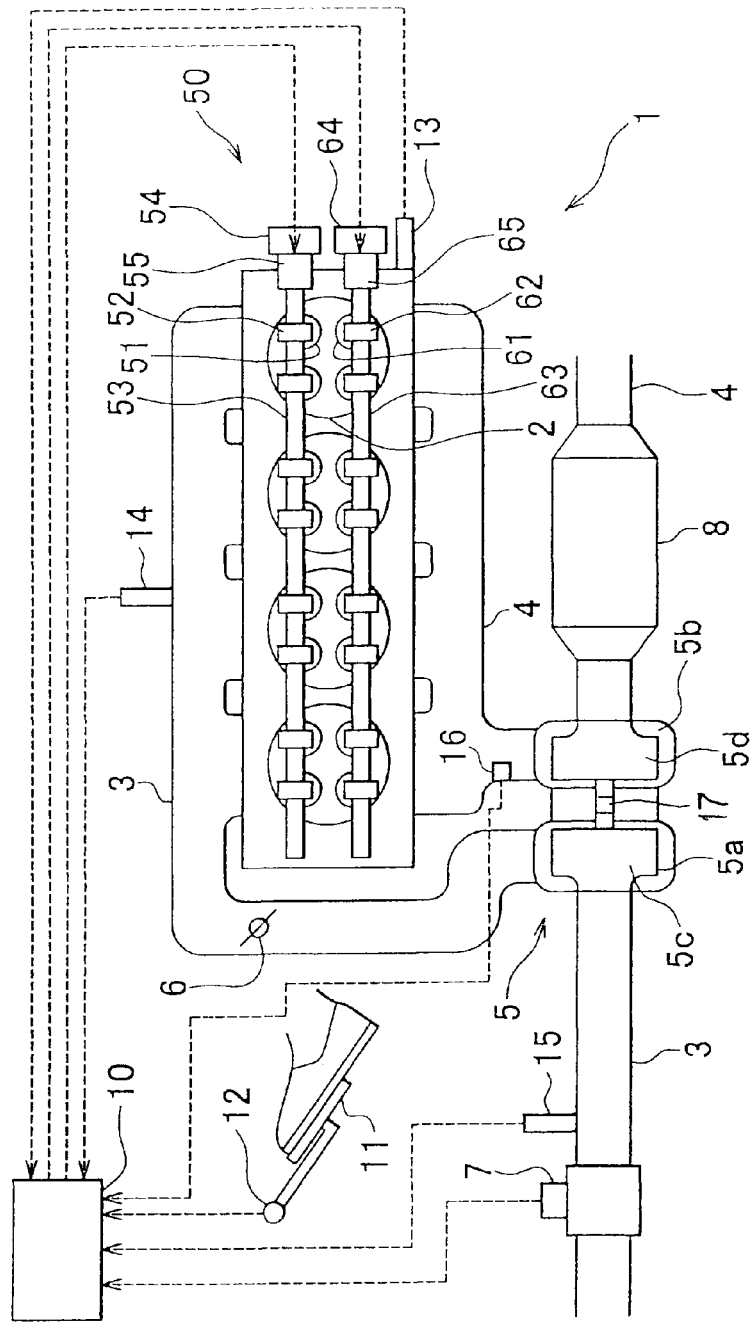
FIG. 1 is a diagram showing an overall construction of an internal combustion engine and its intake/exhaust system to which a boost pressure control apparatus of an internal combustion engine in accordance with an embodiment of the invention is applied.

An embodiment as an example of the invention will be described below. FIG. 1 is a diagram showing an overall construction of an internal combustion engine and its intake/exhaust system to which a boost pressure control apparatus of an internal combustion engine in accordance with an embodiment of the invention is applied. An internal combustion engine 1 shown in FIG. 1 is a water-cooled four-stroke gasoline engine that has four cylinders 2.

An intake pipe 3 and an exhaust pipe 4 are connected to the internal combustion engine 1. An intermediate portion of the intake pipe 3 is provided with a compressor housing 5a of a turbocharger 5 that acts using energy of exhaust as a drive source. A compressor 5c is housed in the compressor housing 5a. The intake pipe 3 downstream of the compressor housing 5a is provided with an intake throttle 6 that adjusts the amount of flow of intake flowing in the intake pipe 3. The intake throttle 6 is opened and closed by an electric actuator. The intake pipe 3 upstream of the compressor housing 5a is provided with an air flow meter 7 that outputs a signal that is in accordance with the amount of flow of intake flowing in the intake pipe 3. The intake air amount of the internal combustion engine 1 is measured by the air flow meter 7.

An intermediate portion of the exhaust pipe 4 is provided with a turbine housing 5b of the turbocharger 5. The exhaust pipe 4 downstream of the turbine housing 5b is provided with an exhaust purification catalyst 8. An exhaust turbine 5d that is rotated by energy of exhaust is housed in the turbine housing 5b.

The internal combustion engine 1 in accordance with the embodiment is also equipped with a variable valve mechanism 50. Each cylinder 2 is equipped with two intake valves 51. The opening/closing actions of the intake valves 51 are caused by intake side cams 52. The intake side cams 52 are attached to an intake side camshaft 53. An end portion of the intake side camshaft 53 is provided with an intake side pulley 54. Furthermore, a variable rotational phase mechanism (hereinafter, referred to as "intake side VVT") 55 that allows alteration of the relative rotational phase between the intake side camshaft 53 and the intake side pulley 54 is provided. The intake side VVT 55 controls the relative rotational phase between the intake side camshaft 53 and the intake side pulley 54, following a command from the ECU 10.

The rotational driving of the intake side camshaft 53 is carried out by the driving power of a crankshaft. By the driving power of the crankshaft, the intake side camshaft 53 is rotationally driven, so that the intake side cam 52 is rotated, whereby the intake valves 51 are opened and closed. In this embodiment, the open/close timing of the intake valves 51 is advanced or retarded from the intake top dead center by the variable valve mechanism 50 so that the amount of burned gas in the cylinders 2 is altered. In the embodiment, the burned gas that remains in the cylinders 2 in this manner is termed internal EGR gas.

Each cylinder 2 is provided with two exhaust valves 61, and the opening/closing actions of the exhaust valves 61 are caused by exhaust side cams 62. The exhaust side cams 62 are attached to an exhaust side camshaft 63. An end portion of the exhaust side camshaft 63 is provided with an exhaust side pulley 64. Furthermore, a variable rotational phase mechanism (hereinafter, referred to as "exhaust side VVT") 65 that allows alteration of the relative rotational phase between the exhaust side camshaft 63 and the exhaust side pulley 64 is provided. The exhaust side VVT 65 controls the relative rotational phase between the exhaust side camshaft 63 and the exhaust side pulley 64, following a command from the ECU 10.

The rotational driving of the intake side camshaft 53 and the exhaust side camshaft 63 is carried out by the driving power of the crankshaft. By the driving power of the crankshaft, the intake side camshaft 53 and the exhaust side camshaft 63 are rotationally driven, so that the intake side cam 52 and the exhaust side cams 62 are rotated, whereby the intake valves 51 the exhaust valve 61 are opened and closed. In this embodiment, the open/close timings of the intake valves 51 and the exhaust valves 61 are advanced or retarded by the variable valve mechanism 50 so that the amount of burned gas in the cylinders 2 is altered. In the embodiment, the burned gas that remains in the cylinders 2 in this manner is termed internal EGR gas.

The internal combustion engine 1 constructed as described above is provided with the ECU 10 that is an electronic control unit for controlling the internal combustion engine 1. The ECU 10 is a unit that controls the operation state of the internal combustion engine 1 in accordance with the operating condition of the internal combustion engine 1 or a request from a driver. Various sensors, including an accelerator operation amount sensor 12 capable of outputting an electric signal in accordance with the amount of the driver's depression of an accelerator pedal 11 and detecting the engine load, a crank position sensor 13 that detects the engine rotation speed, a downstream side intake pressure sensor 14 that outputs a signal in accordance with the pressure in the intake pipe 3 downstream of the intake throttle 6, an upstream side intake pressure sensor 15 that outputs a signal in accordance with the pressure in the intake pipe 3 upstream of the intake throttle 6, an exhaust temperature sensor 16 that outputs a signal in accordance with the temperature of exhaust, a rotational speed sensor (17) that outputs a signal in accordance with the rotational speed of the turbine, etc., are connected to the ECU 10 via electric wirings. The output signals of the various sensors are input to the ECU 10. Besides, the intake throttle 6, the intake side VVT 55 and the exhaust side VVT 65 are connected to the ECU 10 via electric wirings. These appliances are controlled by the ECU 10.

The ECU 10 adjusts the internal EGR gas amount. The amount of internal EGR gas can be adjusted by controlling the intake side VVT 55. Furthermore, the amount of internal EGR gas can also be adjusted by controlling the exhaust side VVT 65. Therefore, the intake side VVT 55 and the exhaust side VVT 65 are sometimes termed EGR device. If the opening timing of an intake valve 51 is made earlier than the exhaust top dead center, the intake valve 51 is opened during the exhaust stroke. Then, if the pressure in the intake pipe 3 is lower than the pressure in the exhaust pipe 4, burned gas in the cylinder 2 is refluxed into the intake pipe 3 as the piston rises. The refluxed burned gas flows into the cylinder 2 again in the immediately subsequent intake stroke. That is, the internal EGR gas amount can be increased progressively as the timing of opening the intake valves 51 is advanced further from the exhaust top dead center.

Figure 2:
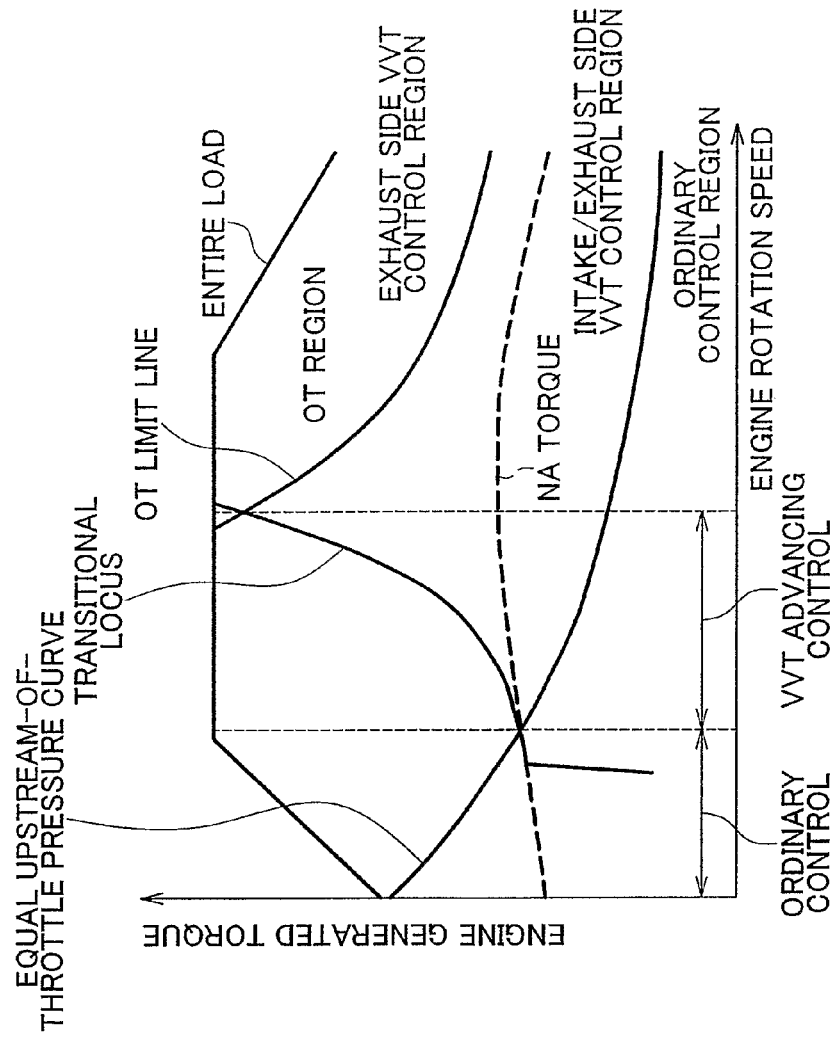
FIG. 2 is a diagram showing a relationship between the engine rotation speed and the engine generated torque in accordance with the embodiment.
Figure 3:
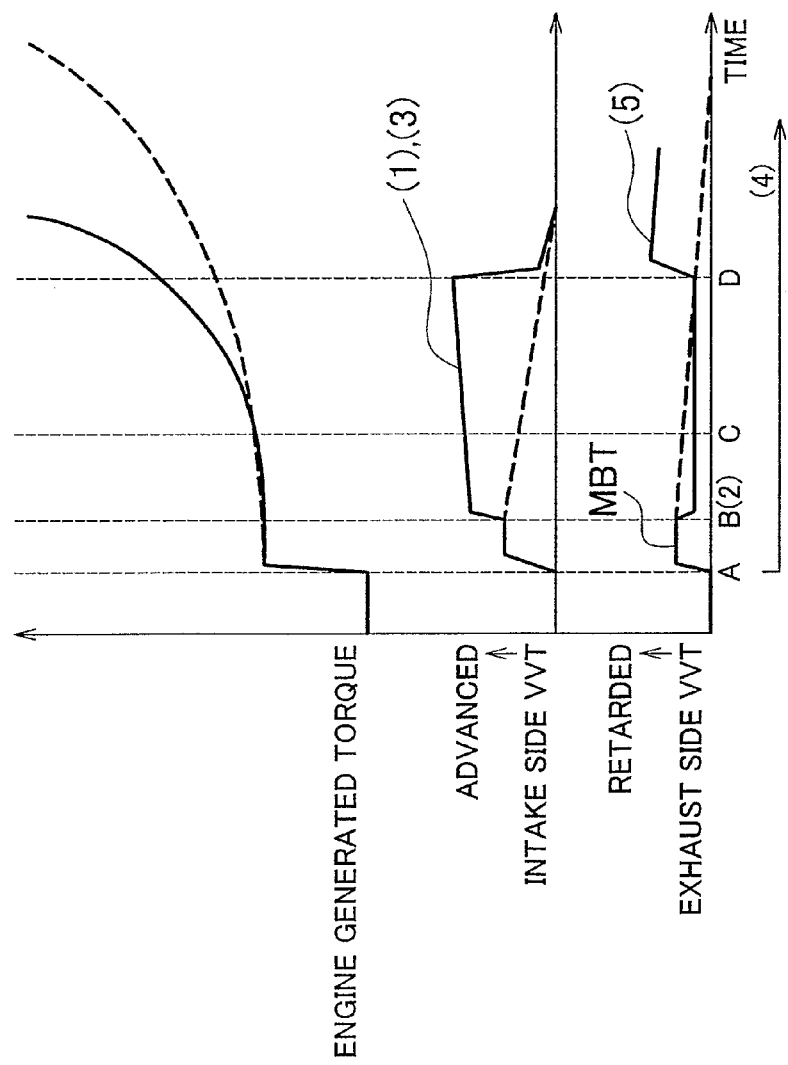
FIG. 3 is a time chart showing transitions of the boost pressure, the engine generated torque, the control value of the intake side VVT, and the control value of the exhaust side VVT in accordance with the embodiment, and the corresponding values in accordance with the related-art control.

FIG. 2 is a diagram showing a relationship between the engine rotation speed and the engine generated torque in accordance with the embodiment. FIG. 3 is a time chart showing transitions of the boost pressure, the engine generated torque, the control value of the intake side VVT, and the control value of the exhaust side VVT in accordance with the embodiment, and the corresponding values in accordance with the related-art control.

In FIG. 2, the "equal upstream-of-throttle pressure curve" is a line that indicates the engine generated torque for each engine rotation speed which torque occurs when the pressures in the intake pipe 3 on the upstream side and on the downstream side of the intake throttle 6 are equal. The "OT limit line" is a line that indicates the lowest value of the engine generated torque for each engine rotation speed which torque can cause overheating of the turbocharger 5 or the exhaust purification catalyst 8. The "transitional locus" shows changes in the operation state of the internal combustion engine 1 during acceleration according to the embodiment. The "NA torque" indicates the engine generated torque for each engine rotation speed which torque occurs when supercharge is not performed.

In FIG. 2, an operation region where the engine generated torque is below the "equal upstream-of-throttle pressure curve" is shown as an "ordinary control region". In this "ordinary control region", the intake side VVT 55 and the exhaust side VVT 65 are controlled so that the engine generated torque becomes maximum for each engine rotation speed. Specifically, in the operation region shown as the "ordinary control region", the control of the intake side VVT 55 and the exhaust side VVT 65 for actively increasing the energy of exhaust is not performed.

This is because when the pressure on the downstream side of the intake throttle 6 is lower than or equal to the pressure on the upstream side thereof, a ratio value ($\Delta Pm/\Delta TCR$) of the amount of rise $\Delta Pm$ in the boost pressure to the amount of rise $\Delta TCR$ in the rotation speed of the exhaust turbine 5d is small, so that increases in the energy of exhaust do not greatly raise the boost pressure. Besides, in such a state, the temperature of internal EGR is also low. In this respect, too, the responsiveness of boost pressure is not enhanced. In such an operation state, the engine generated torque can be more promptly increased by raising the engine rotation speed than by increasing the energy of exhaust. Therefore, if the boost pressure or the rotation speed of the exhaust turbine 5d is less than or equal to a predetermined value (equal upstream-of-throttle pressure curve), the control of the intake side VVT 55 and the exhaust side VVT 65 is not performed. Then, the intake side VVT 55 and the exhaust side VVT 65 are controlled so that the engine generated torque becomes maximum. Incidentally, the time point at which control of the "ordinary control region" is started is shown by a symbol (2) in FIG. 3.

Furthermore, in FIG. 2, an operation region bordered by the "equal upstream-of-throttle pressure curve" and the "OT limit line" is shown as an "intake/exhaust side VVT control region". In this operation region, the internal EGR is increased by the intake side VVT 55 and the exhaust side VVT 65.

Immediately after the "intake/exhaust side VVT control region" is entered, the pressure in the exhaust pipe 4 is higher than the pressure in the intake pipe 3. Firstly in this operation region, the internal EGR is increased by the intake side VVT 55 shifting the opening timing of the intake valves 51 from the MBT point (the timing at which the engine generated torque becomes maximum) so as to increase the overlap. This allows a part of the energy of exhaust provided in the present cycle to be used in the next cycle, so that the total amount of energy in the next cycle increases although the torque generated in the present cycle declines. Therefore, the degree of the retardation of the ignition timing carried out for increasing the energy of exhaust can be reduced, and therefore the decline of the generated torque can be restrained. The amount of advancement of the opening timing of the intake valves 51 on this occasion is determined so that the internal EGR gas amount becomes maximum.

At the same time, the opening timing of the exhaust valves 61 may also be advanced by the exhaust side VVT 65. This raises the back pressure, and therefore makes it possible to further increase the internal EGR gas amount. The advancement of the opening timing of the exhaust valves 61 is performed while the period of overlap with the intake valves 51 is kept constant.

Furthermore, in the case of a system capable of independently controlling the closure timing of the intake valves 51, the intake air amount can be maximized by setting the closure timing of the intake valves 51 near the intake bottom dead center. This will further increase the engine generated torque. Incidentally, a period of execution of the control for an occasion when the present operation region is the "intake/exhaust side VVT control region" and the pressure in the exhaust pipe 4 is higher than the pressure in the intake pipe 3 is shown by a symbol (1) in FIG. 3.

In the case where the present operation region is the "intake/exhaust side VVT control region" and the pressure in the intake pipe 3 is high, that is, higher than or equal to the pressure in the exhaust pipe 4, the opening timing of the intake valves 51 is advanced so that the proportion of the decline in the generated torque to the torque generated at the MBT point is in a predetermined range and the rotation speed of the exhaust turbine 5d (or the boost pressure) becomes maximum. Here, the opening timing of the intake valves 51 is controlled so that the amount of air taken into the cylinders becomes maximum.

Incidentally, if the opening timing of the intake valves 51 is excessively advanced, the overlap period becomes excessively long, and the temperature at the end of the compression stroke becomes high. Since this incurs the risk of occurrence of knocking, the ignition timing is retarded. Therefore, the engine generated torque declines. However, although the retardation of the ignition timing sacrifices the engine generated torque to some degree, the advancement of the opening timing of the intake valves 51 brings about the blow-by of air from the intake pipe 3 to the exhaust pipe 4. This increases the intake air amount, so that the engine generated torque can be increased. Specifically, if the portion of the decline in the generated torque to the torque generated at the MBT point is within the predetermined range, the decline in the engine generated torque is surpassed by the rise in the engine generated torque caused by the boost pressure rise in the next and later cycles, so that the engine generated torque can be raised in the next and later cycles.

At the same time, the opening timing of the exhaust valves 61 is retarded by the exhaust side VVT 65. This lengthens the time during which the burned gas pushes down the piston in the expansion stroke, so that the engine generated torque can be raised.

Furthermore, in the case of the system capable of independently controlling the closure timing of the intake valves 51, the intake air amount can be maximized by setting the closure timing of the intake valves 51 near the intake bottom dead center. This will further increase the engine generated torque. Incidentally, a period of execution of the control for an occasion when the present operation region is the "intake/exhaust side VVT control region" and the pressure in the intake pipe 3 is higher than or equal to the pressure in the exhaust pipe 4 is shown by a symbol (3) in FIG. 3.

In the related art, since an increase of the internal EGR causes slow combustion, the ignition timing is advanced in order to make up for the decline of the engine generated torque caused by the slow combustion. On the other hand, in the embodiment, in a region where there is no risk of occurrence of knocking (hereinafter, referred to as "outside of the knock region), the advancement of the ignition timing is avoided so that the temperature of exhaust is further raised. In a region where there is a risk of occurrence of knocking (hereinafter, referred to as "knock region"), a retarding compensation of the ignition timing is performed so that the knocking does not occur. Incidentally, an operation state where such control is performed is shown in FIG. 3 by a symbol (4).

Furthermore, in FIG. 2, an operation region where the engine generated torque is above the "OT limit line" is shown as the "exhaust side VVT control region". In this region, the opening timing of the exhaust valves 61 is, for example, retarded, by the exhaust side VVT 65.

In the region where there is a risk of overheating of the turbocharger 5 or the exhaust purification catalyst 8 (hereinafter, referred to as "OT region"), the turbocharger 5 or the exhaust purification catalyst 8 is overheated if the temperature of exhaust is raised. Therefore, in this region, it is difficult to raise the temperature of exhaust. Hence, the opening timing of the exhaust valves 61 is retarded by the exhaust side VVT 65, and the overlap is increased, so that the air having flown from the intake pipe 3 into the cylinder 2 is directly discharged into the exhaust pipe 4. Therefore, the dynamic pressure energy given to the exhaust turbine 5d can be increased, so that the responsiveness of boost pressure rise can be enhanced. Besides, if the opening timing of the exhaust valves 61 is retarded by the exhaust side VVT 65, the time during which the burned gas pushes the piston down in the expansion stroke is lengthened, so that the engine generated torque can be raised. Incidentally, a period during which the control is performed in the "exhaust side VVT control region" is shown by a symbol (5) in FIG. 3.

In FIG. 3, solid line curves show transitions caused by the control according to the embodiment, and broken lines show transitions caused by the control according to the related art. In the related art, the intake side VVT 55 and the exhaust side VVT 65 are controlled, with the MBT being a target. At a time shown by A in FIG. 3, a driver makes an acceleration request by depressing the accelerator pedal 11. From the time A to a time B, the engine operation state is in the "ordinary operation control region" where the pressure on the downstream side of the intake throttle 6 is less than or equal to the pressure on the upstream side thereof. During the period of A to B, the same control is performed in the embodiment and the related art.

At the time shown by B in FIG. 3, the pressures in the intake pipe 3 on the upstream side and on the downstream side of the intake throttle 6 become equal. Then, from the time shown by B on, the engine operation state is in the "intake/exhaust side VVT control region". In the related art, the opening and closure timings of the intake and exhaust valves are controlled with the MBT point being the target in this operation region as well. Therefore, in FIG. 3, the opening and closure timings of the intake valves 51 are retarded by the intake side VVT 55 in the control according to the related art. However, in the control according to the embodiment, the opening and closure timings of the intake valves 51 are advanced without using the MBT point as a target. Besides, in the control according to the related art, the opening and closure timings of the exhaust valves 61 are gradually advanced by the exhaust side VVT 65. In the control according to the embodiment, on the other hand, the opening and closure timings of the exhaust valves 61 are advanced once, and then are kept fixed, so that more burned gas is blown back into the intake pipe 3.

Then, at a time shown by C, the boost pressure based on the control in accordance with the embodiment becomes greater than the boost pressure based on the control in accordance with the related art. Then, at a time shown by D, the operation state reaches the "OT limit line". From the time shown by D on, the operation state is in the "exhaust side VVT control region".

Figure 4:
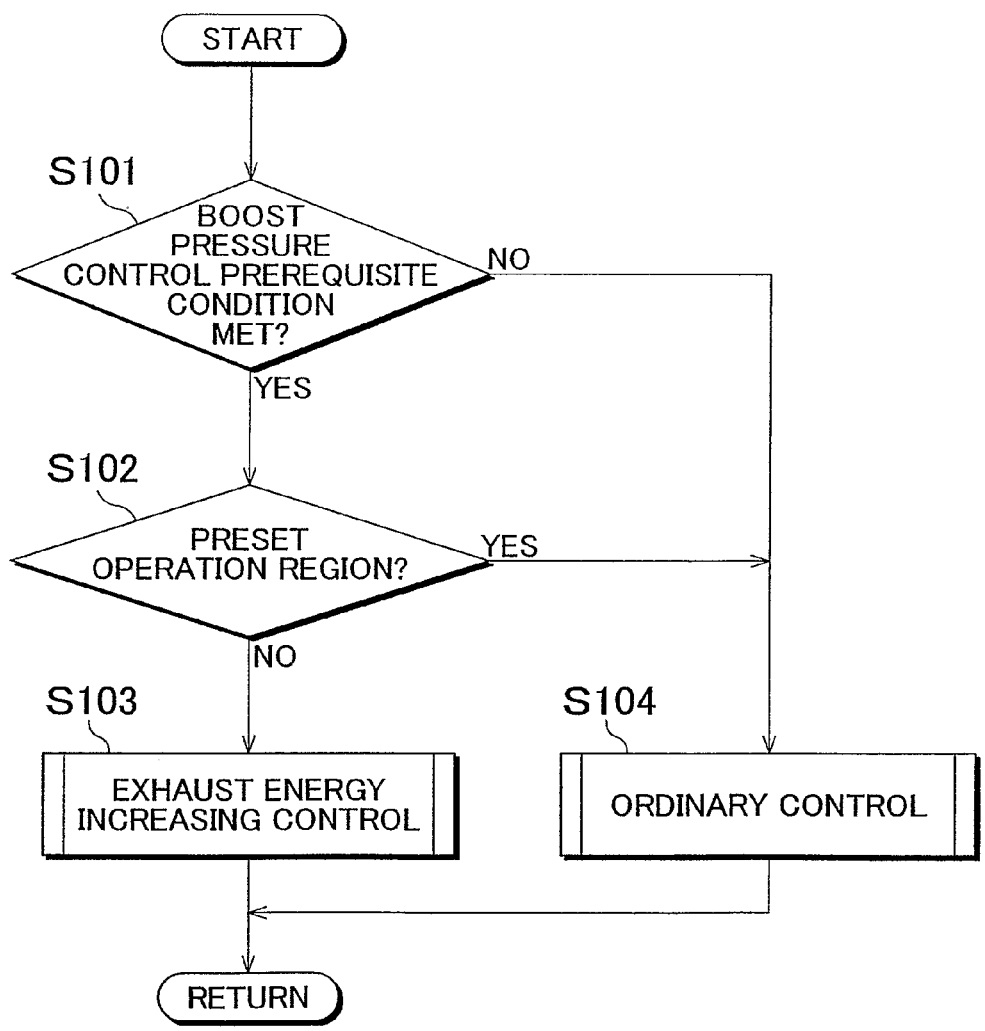
FIG. 4 is a flowchart showing a flow of a boost pressure control according to the embodiment.

Next, the boost pressure control according to the embodiment will be described. FIG. 4 is a flowchart showing a flow of the boost pressure control according to the embodiment. This routine is repeatedly executed at every predetermined time in the case where the supercharge by the turbocharger 5 is needed.

At step S101, it is determined whether or not a boost pressure control prerequisite condition is met. The boost pressure control prerequisite condition is a condition that serves as a prerequisite for execution of the boost pressure control in the embodiment. It is assumed that the condition is met if there is an acceleration request or after a fuel cut has been performed. Besides, at the time of steady operation or gentle acceleration, execution of the boost pressure control can deteriorate fuel economy. Therefore, in such cases, it is assumed the condition is not met. If an affirmative determination is made at step S101, the process proceeds to step S102. On the other hand, if a negative determination is made at step S101, the process proceeds to step S104.

At step S102, it is determined whether or not the internal combustion engine 1 is being operated in a predetermined region. The predetermined region is a region where the pressure in the intake pipe 3 downstream of the intake throttle 6 is less than or equal to the pressure in the intake pipe 3 upstream of the intake throttle 6. These pressures can be obtained via the downstream side intake pressure sensor 14 and the upstream side intake pressure sensor 15. Specifically, at this step, it is determined whether or not the engine generated torque is in the ordinary control region" below the "equal upstream-of-throttle pressure curve" in FIG. 2. In the case where ΔPm/ΔTCR is small, rise in the boost pressure can hardly be expected even if the rotation speed of the exhaust turbine 5d is raised by an increase in the energy of exhaust.

Figure 5:
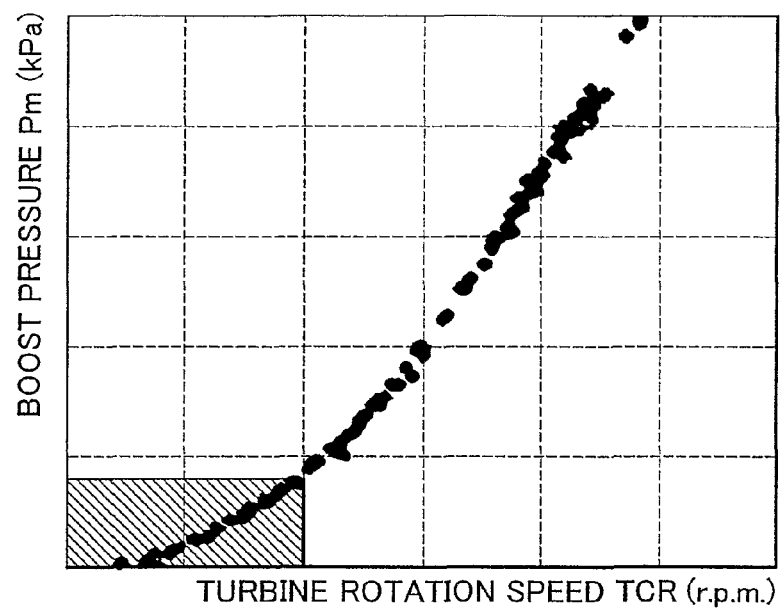
FIG. 5 is a diagram showing a relationship between the rotation speed TCR and the boost pressure Pm of an exhaust turbine.

FIG. 5 is a diagram showing a relationship between the rotation speed TCR and the boost pressure Pm of the exhaust turbine 5d. In a part shown by hatching in FIG. 5, $\Delta Pm/\Delta TCR$ is less than or equal to a predetermined value. The part is, for example, a region where the rotation speed TCR of the exhaust turbine 5d is less than or equal to 50000 rpm and the boost pressure Pm is less than or equal to 14 kPa. In the region shown by hatching, since $\Delta Pm/\Delta TCR$ is small, a setting may be made such that the raise of the boost pressure by increasing the exhaust energy is not performed. Specifically, at this step, if the turbine rotation speed is less than or equal to the predetermined value, it may be determined that the operation state is in the "ordinary control region" and the boost pressure control may be avoided. If an affirmative determination is made at step S102, the process proceeds to step S104. On the other hand, if a negative determination is made at step S102, the process proceeds to step S103.

At step S103, an exhaust energy increasing control is performed. Details thereof will be described later.

At step S104, a related-art boost pressure control without the exhaust energy increasing control, that is, an ordinary control, is performed.

Figure 6:
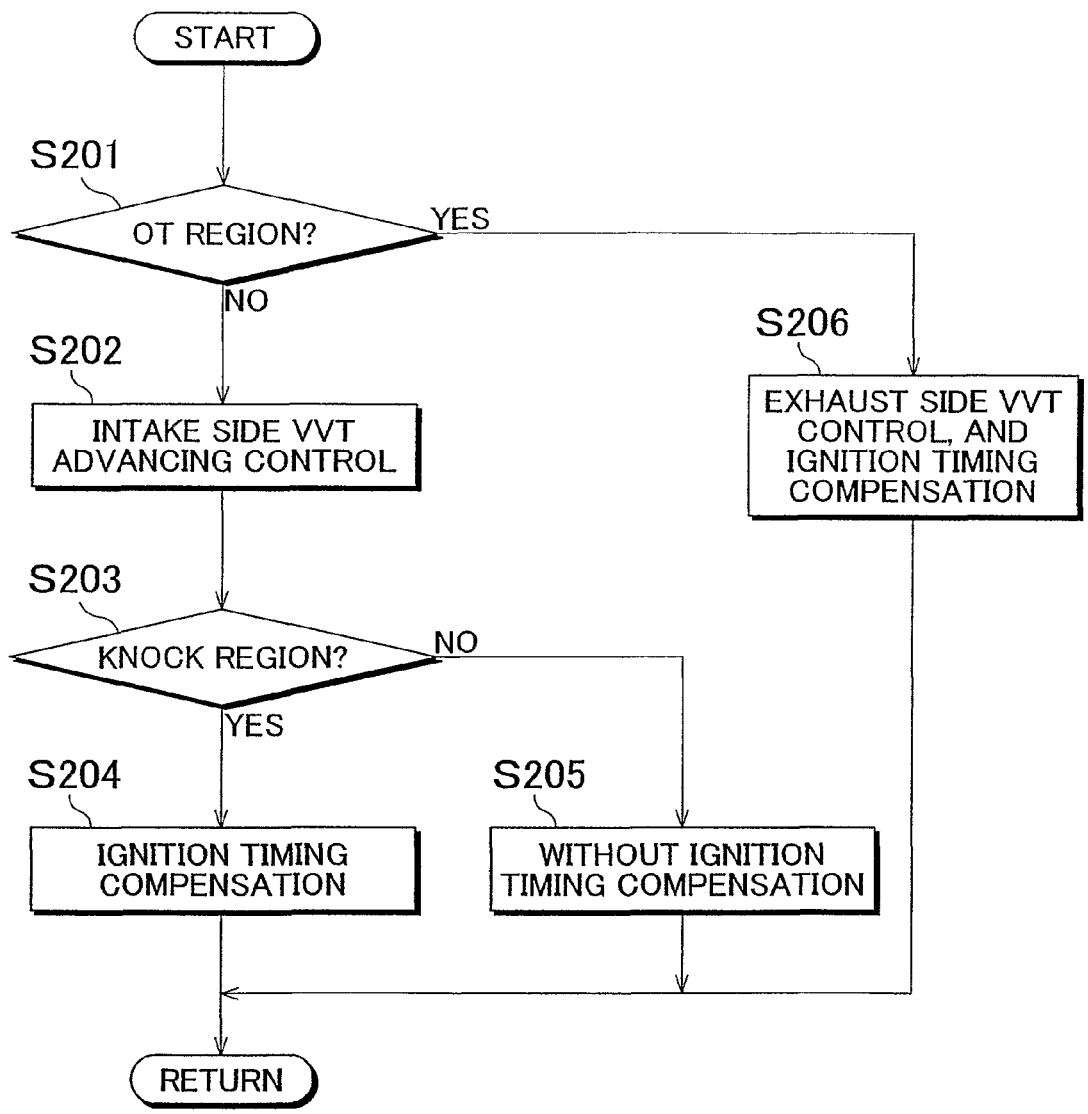
FIG. 6 is a flowchart showing a flow of an exhaust energy increasing control according to the embodiment.

Next, a flow of the exhaust energy increasing control will be described. FIG. 6 is a flowchart showing a flow of the exhaust energy increasing control according to the embodiment. This routine is executed at step S103 as mentioned above.

At step S201, it is determined whether or not the operation region of the internal combustion engine 1 is the OT region. Specifically, it is determined whether or not the operation region of the engine is an operation region in which the temperature of exhaust can be raised. The determination is performed by substituting the engine rotation speed and the engine load in FIG. 2. If an affirmative determination is made at step S201, the process proceeds to step S206. On the other hand, if a negative determination is made at step S201, the process proceeds to step S202.

At step S202, the opening timing of the intake valves 51 is advanced by the intake side VVT 55. Therefore, since the intake valves 51 are opened in a middle of the exhaust stroke, a portion of the burned gas is refluxed into the intake pipe 3. Then, in the subsequent intake stroke, the burned gas in the intake pipe 3 is sucked into the cylinder 2. Thus, at this step, the internal EGR is increased. As a result, the temperature in the cylinder 2 at the end of the compression stroke rises, so that the energy of exhaust is increased.

Figure 7:
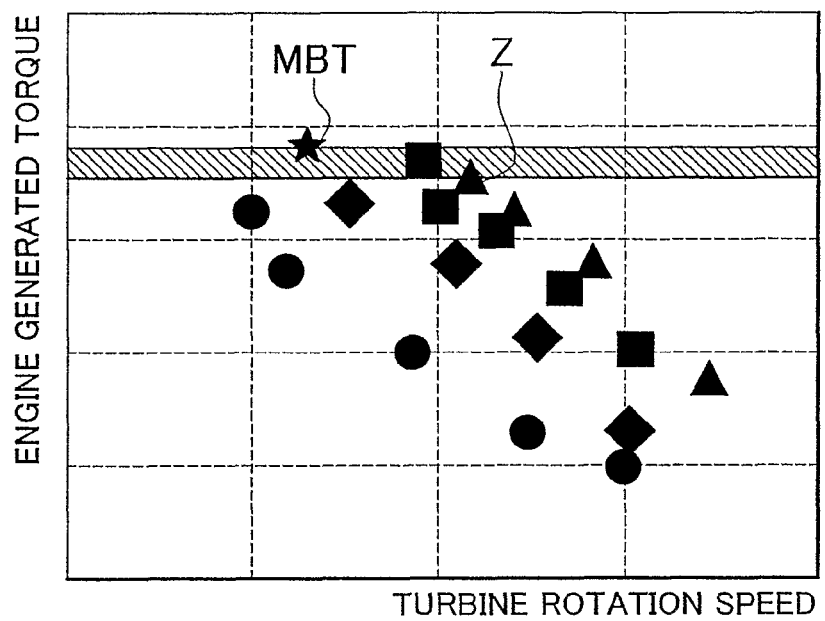
FIG. 7 is a diagram showing a relationship between the rotation speed of the exhaust turbine and the engine generated torque.

FIG. 7 is a diagram showing a relationship between the rotation speed of the exhaust turbine 5d and the engine generated torque. In FIG. 7, identical graphic symbols mean the same opening and closure timings of the exhaust valves 61 with different opening and closure timings of the intake valves 51. If the opening and closure timings of the intake valves 51 are further advanced, the engine generated torque progressively declines. Besides, the opening and closure timings of the exhaust valves 61 are the earliest with the circle symbols, and become progressively later toward the triangle symbols. Then, a control value of the intake side VVT 55 is selected such that the rotation speed of the exhaust turbine 5d becomes maximum in a range of the MBT shown by hatching in FIG. 7. This is equivalent to acquiring a control value of the intake side VVT 55 such that the intake air amount becomes maximum. Specifically, the opening and closure timings of the intake valves 51 and the exhaust valves 61 are controlled so that the state of a point shown by Z in FIG. 7 is obtained. As a result, the torque generated in the present cycle declines, but the responsiveness of the boost pressure becomes enhanced in the next and later cycles. Thus, the decline of the generated torque can be cancelled out in the next and later cycles.

At step S203, it is determined whether or not the operation region of the 1 is the knock region.

Figure 8:
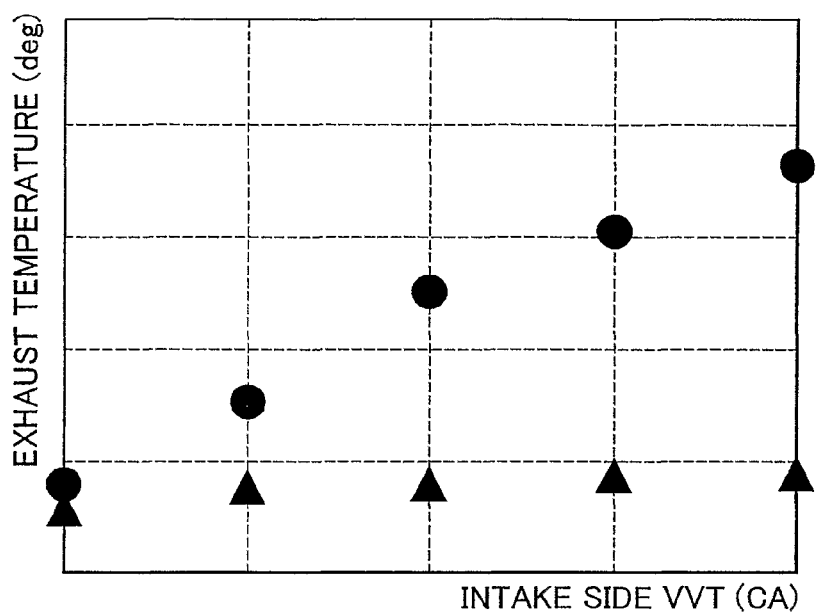
FIG. 8 is a diagram showing a relationship between the opening timing of an intake valve and the temperature of exhaust.

If the load of the internal combustion engine 1 is intermediate or high, there is a risk of occurrence of knocking; therefore, the ignition timing is compensated so that knocking does not occur. FIG. 8 is a diagram showing a relationship between the opening timing of the intake valves 51 and the temperature of exhaust. The triangle symbols indicate that the ignition timing is compensated, and the circle symbols indicate that the ignition timing is not compensated. By compensating the ignition timing in this manner, the rise in the exhaust temperature can be restrained. Then, when there is a risk of occurrence of knocking, occurrence of knocking can be restrained by compensating the ignition timing so as to restrain the rise in the exhaust temperature. Incidentally, a knock region is determined beforehand through experiments or the like and stored in the form of a map on the basis of the engine rotation speed and the engine generated torque. Then, it is determined whether or not the present operation region is the knock region by substituting the present-time engine rotation speed and the present-time engine load. If an affirmative determination is made at step S203, the process proceeds to step S204. On the other hand, if a negative determination is made at step S203, the process proceeds to step S205.

At step S204, the ignition timing is compensated so that knocking does not occur. This restrains the combustion temperature, and therefore restrains occurrence of knocking.

At step S205, compensation of the ignition timing is prevented from being performed. Since there is no risk of occurrence of knocking, the ignition timing can remain as it is, so that the energy of exhaust can be further increased.

Figure 9:
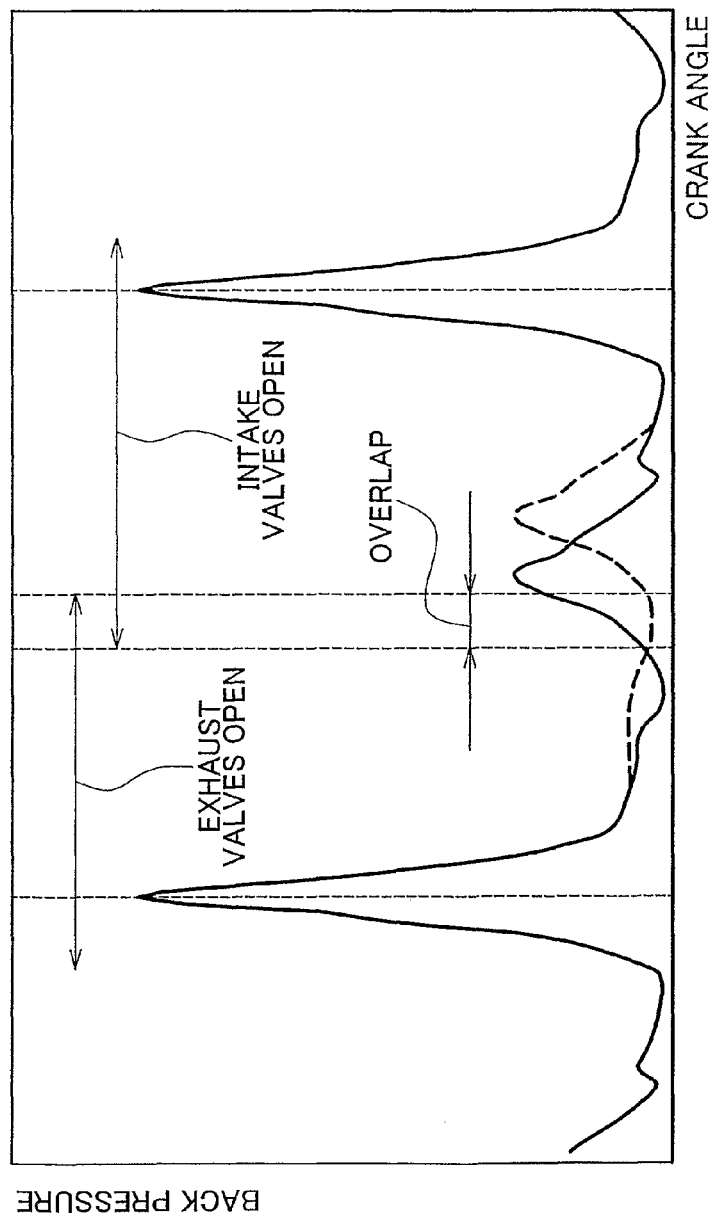
FIG. 9 is a diagram showing transition of changes in the pressure (back pressure) in an exhaust pipe.

At step S206, a control of altering the opening and closure timings of the exhaust valves 61 via the exhaust side VVT 65, and compensation of the ignition timing are performed. In the OT region, it is difficult to raise the boost pressure by raising the temperature of exhaust. Therefore, the boost pressure is raised by enhancing the rate of flow of exhaust. Firstly, in the control of altering the opening and closure timings of the exhaust valves 61 via the exhaust side VVT 65, the timing of occurrence of exhaust pulsation is changed so as to decline the back pressure during the valve overlap. FIG. 9 is a diagram showing transition of changes in the pressure (back pressure) in the exhaust pipe 4. In FIG. 9, the horizontal axis indicates the crank angle. The solid line curve and the broken line curve indicate the pre-timing-alteration transition and the post-timing-alteration transition, respectively. In the embodiment, since the four-cylinder internal combustion engine 1 is employed, the pressure of exhaust from a cylinder fluctuates due to exhaust from the other cylinders. By shifting the timing of such exhaust pulsation, the back pressure during the valve overlap can be declined. As a result, air introduced from the intake pipe 3 into the cylinder 2 directly blows by into the exhaust pipe 4. Therefore, flow of exhaust is caused near the end of the exhaust stroke, so that kinetic energy can be given to the exhaust turbine 5d. Thus, the boost pressure can be promptly raised.

By controlling the opening and closure timings of the intake valves 51, and the opening and closure timings of the exhaust valves 61 as well as the ignition timing in the above-described manner, the energy of exhaust can be increased. Therefore, the responsiveness at the time of raising the boost pressure is enhanced, so that the drivability can be improved. Besides, in the case where the pressure on the downstream side of the intake throttle 6 is less than or equal to the pressure on the upstream side thereof, the engine generated torque can be increased by prohibiting the internal EGR; therefore, the intake air amount can be increased by increasing the engine rotation speed. Therefore, the responsiveness of boost pressure rise can be improved. Furthermore, when the boost pressure becomes high to a certain degree, decline of the generated torque can be restrained by restricting the amount of advancement of the opening timing of the intake valves 51, so that the responsiveness of boost pressure rise can be improved. By simultaneously retarding the opening timing of the exhaust valves 61, the engine generated torque based on burned gas can be increased. Besides, by prohibiting advancement of the ignition timing when there is no risk of occurrence of knocking, the exhaust temperature correspondingly is raised corresponding to a decrease in the engine generated torque; therefore, the exhaust energy can be increased, so that the responsiveness of boost pressure rise can be bettered.

The invention claimed is:

1. A boost pressure control method of an internal combustion engine including a turbocharger with a compressor and a turbine which is rotationally driven by exhaust of an internal combustion engine, and an EGR device, comprising: determining a rotation speed of the turbine;
determining a boost pressure of the turbine;
comparing a ratio of the boost pressure of the compressor to the rotation speed of the turbine with a predetermined value;
performing EGR at a time of supercharge, or increasing an EGR amount at the time of supercharge in comparison with when supercharge is not performed if the ratio of the boost pressure of the compressor to the rotation speed of the turbine is greater than the predetermined value; and
adjusting opening timing of the intake valve so that an engine generated torque is within a predetermined range and an internal EGR gas amount becomes maximum,
wherein the EGR performed at the time of supercharge is an internal EGR performed by controlling opening/closure timing of at least one of an intake valve and an exhaust valve.

2. The boost pressure control method of the internal combustion engine according to claim 1, wherein
if a pressure of intake is lower than a predetermined value, the EGR at the time of supercharge is prohibited.

3. The boost pressure control method of the internal combustion engine according to claim 2, wherein
when at the time of supercharge an EGR gas amount is increased, an ignition timing is not advanced.

4. The boost pressure control method of the internal combustion engine according to claim 1, wherein
when at the time of supercharge an EGR gas amount is increased, an ignition timing is not advanced.

5. The boost pressure control method of the internal combustion engine according to claim 1, further comprising determining a temperature of the exhaust gas, wherein
the EGR performed at the time of supercharge is based on whether an operation region of the engine in which the temperature of the exhaust is raised.

6. The boost pressure control method of the internal combustion engine according to claim 5, wherein
if the temperature of the exhaust is raised, the variable valve mechanism advances an opening timing of the intake valve such that the intake valve is opened in a middle of an exhaust stroke and a portion of burned gas is refluxed into an intake pipe, and in a subsequent intake stroke, the burned gas in the intake pipe is sucked into a cylinder.

7. The boost pressure control method of the internal combustion engine according to claim 5, wherein
if the temperature of the exhaust is not raised, the variable valve mechanism changes a timing of occurrence of exhaust pulsation so as to reduce back pressure during valve overlap.

8. A boost pressure control apparatus of an internal combustion engine, comprising:
a turbocharger with a turbine which is rotationally driven by exhaust of an internal combustion engine and a compressor;
an EGR device;
a variable valve mechanism that alters opening/closure timing of at least one of an intake valve and an exhaust valve;
a speed sensor which senses a rotation speed of the turbine;
a pressure sensor which senses a boost pressure of the compressor; and
a controller which is configured to compare a ratio of the boost pressure of the compressor from the pressure sensor to the rotation speed of the turbine from the speed sensor and a predetermined value, wherein
EGR is performed at a time of supercharge, or an EGR amount is increased at the time of supercharge in comparison with when supercharge is not performed if the ratio of the boost pressure of the compressor to the rotation speed of the turbine is greater than the predetermined value,
the EGR performed at the time of supercharge is an internal EGR performed by controlling opening/closure timing of the at least one of the intake valve and the exhaust valve, and
the opening timing of the intake valve is adjusted so that an engine generated torque is within a predetermined range and an internal EGR gas amount becomes maximum.

9. The boost pressure control apparatus of the internal combustion engine according to claim 8, wherein
if a pressure of intake is lower than a predetermined value, the EGR at the time of supercharge is prohibited.

10. The boost pressure control apparatus of the internal combustion engine according to claim 9, wherein
when at the time of supercharge an EGR gas amount is increased, an ignition timing is not advanced.

11. The boost pressure control apparatus of the internal combustion engine according to claim 10, wherein
when at the time of supercharge an EGR gas amount is increased, an ignition timing is not advanced.

12. The boost pressure control apparatus of the internal combustion engine according to claim 8, further comprising a temperature sensor which senses a temperature of the exhaust gas, wherein
the controller is further configured to determine the EGR performed at the time of supercharge based on whether an operation region of the engine in which the temperature of the exhaust is raised.

13. The boost pressure control apparatus of the internal combustion engine according to claim 12, wherein
if the temperature of the exhaust is raised, the variable valve mechanism advances an opening timing of the intake valve such that the intake valve is opened in a middle of an exhaust stroke and a portion of burned gas is refluxed into an intake pipe, and in a subsequent intake stroke, the burned gas in the intake pipe is sucked into a cylinder.

14. The boost pressure control apparatus of the internal combustion engine according to claim 12, wherein if the temperature of the exhaust is not raised, the variable valve mechanism changes a timing of occurrence of exhaust pulsation so as to reduce back pressure during valve overlap.

* * * * *